United States Patent [19]
Knox et al.

[11] 4,264,109
[45] Apr. 28, 1981

[54] HYDRAULIC BRAKING SYSTEM

[75] Inventors: Kilbourne H. Knox, Woodland Hills; Stanley R. Bluhm, Manhattan Beach, both of Calif.

[73] Assignee: The Crane Company, New York, N.Y.

[21] Appl. No.: 953,936

[22] Filed: Oct. 23, 1978

Related U.S. Application Data

[62] Division of Ser. No. 346,742, Apr. 2, 1973, Pat. No. 4,121,874.

[51] Int. Cl.² ............................................. B60T 8/02
[52] U.S. Cl. ........................ 303/10; 188/181 A; 303/13; 303/68; 303/84 A; 303/116; 303/119
[58] Field of Search ............................ 303/61–63, 303/6 R, 68, 69, 84, 40, 10, 14, 13, 30, 48, 49, 113–119, 91–99, 100–101, 112; 188/181, 152, 345

[56] References Cited

U.S. PATENT DOCUMENTS

| | | | |
|---|---|---|---|
| 3,503,655 | 3/1970 | Heimler | 303/13 X |
| 3,661,427 | 5/1972 | Hodge | 303/40 X |
| 4,121,874 | 10/1978 | Knox et al. | 188/181 A X |

*Primary Examiner*—Douglas C. Butler
*Attorney, Agent, or Firm*—Hume, Clement, Brinks, Willian & Olds, Ltd.

[57] ABSTRACT

A hydraulic braking system including hydraulically operated brakes and a hydraulic master cylinder for controlling the operation of the brakes. A conversion assembly is used for providing power-assisted braking in the system. The conversion assembly is capable of operating in a manual mode to couple master cylinder pressure to the hydraulic brakes or in a power-assisted mode to supply an amplified hydraulic braking pressure to the hydraulic brakes in response to the master cylinder pressure. The conversion assembly is also operable to provide deceleration control during braking to prevent skidding of the wheels being braked.

24 Claims, 4 Drawing Figures

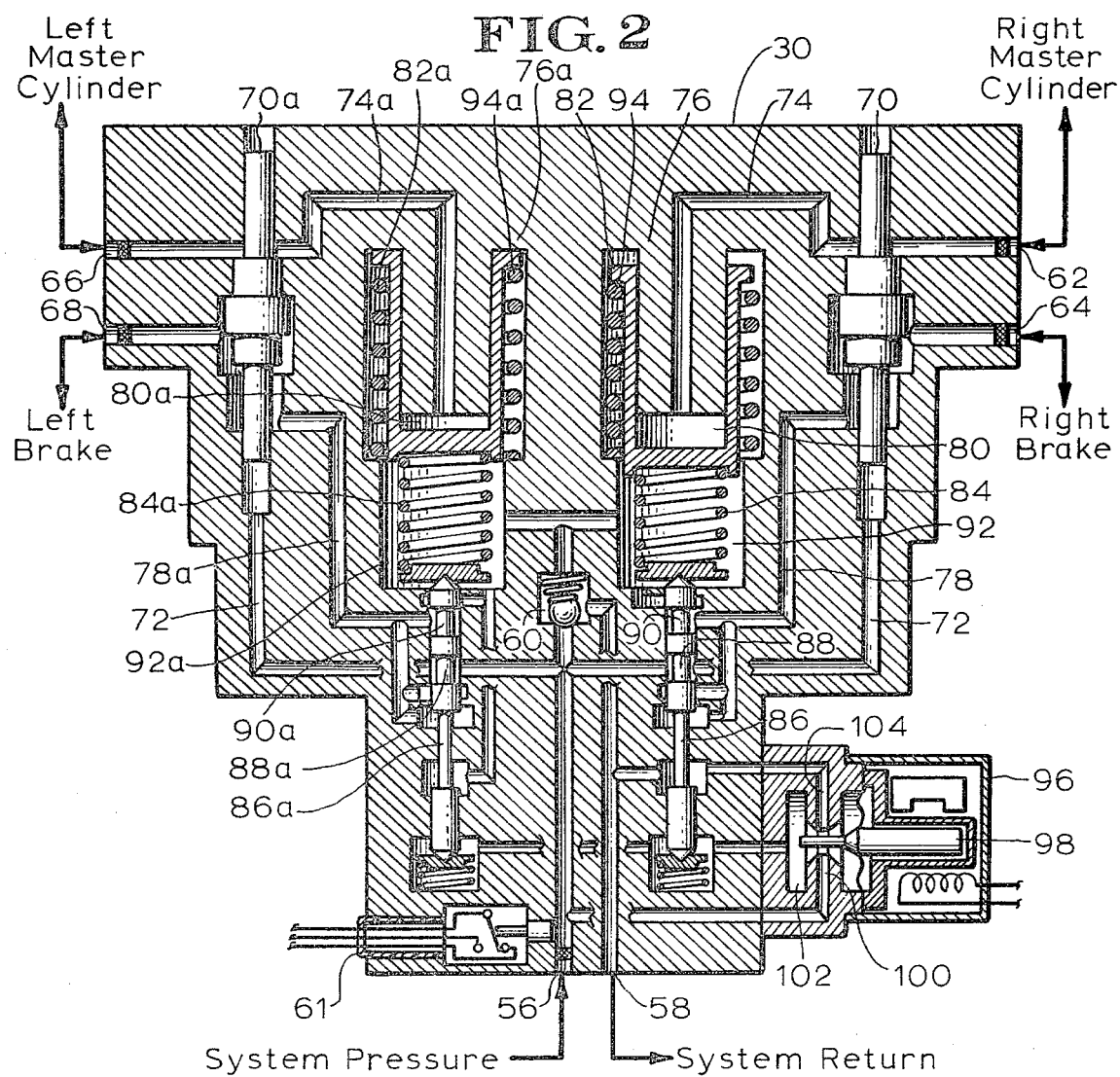
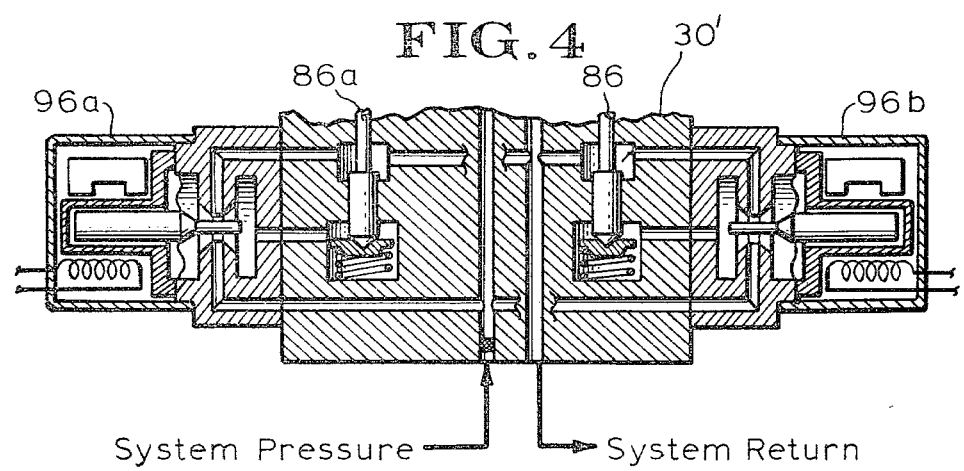

HYDRAULIC BRAKING SYSTEM

This is a division, of application Ser. No. 346,742, filed Apr. 2, 1973, now U.S. Pat. No. 4,121,874.

The invention relates to a hydraulic braking system for a vehicle such as an aircraft. More particularly, the invention relates to a hydraulic braking system having braking means responsive to hydraulic pressure for decelerating the vehicle. Master cylinder means is utilized for generating a hydraulic pressure to control the operation of the braking means and a powered hydraulic pressure source is utilized for supplying system hydraulic pressure. Conversion means is used for amplifying the hydraulic pressure generated by the master cylinder means, with the conversion means receiving system hydraulic pressure from the powered hydraulic pressure source and generating a braking hydraulic pressure for transmission to the braking means.

The conversion means in the hydraulic braking system of the present invention can also be used to control the braking pressure used for decelerating the vehicle being braked to override the hydraulic pressure from the master cylinder for preventing skidding of the wheels on the vehicle. The conversion means provides the anti-skid control in response to signals from an electronic brake control unit having detectors associated with the wheels being braked.

The conversion means can be added to the hydraulic braking system on a vehicle such as an aircraft in order to convert a manually operated hydraulic braking system to a power-assisted hydraulic braking system. The conversion means can be coupled to a powered hydraulic source already existing on the aircraft or a powered hydraulic source can be added along with the conversion means.

The conversion means is operable in the absence of system pressure from the powered hydraulic source to permit the master cylinder means to manually actuate the hydraulic braking means. Thus, failure of the hydraulic power source will not prevent operation of the hydraulic braking system. Additionally, the conversion means is operated to transfer between modes of operation during braking. Thus, the loss of the hydraulic power source or the initiation of operation of the hydraulic power source during braking operation does not prevent operation of the hydraulic braking system of the present invention.

The braking deceleration control to prevent skidding associated with the conversion means is operable to reduce braking pressure below the pressure being applied by the master cylinder means. Additionally, the conversion means does not transfer from the power-assisted mode to the manual mode during periods when braking pressure is reduced below the manual cylinder pressure when the powered hydraulic source is operative in supplying system hydraulic pressure.

Other features of the invention will become apparent from a review of the detailed description and the drawings. One form of the invention is demonstrated in the drawings in which:

FIG. 2 is a schematic diagram of a relay valve used in the hydraulic braking system of FIG. 1 operating in the power-assisted mode;

FIG. 4 is a schematic diagram of a portion of a relay valve having a modified form of deceleration control.

Figure 1:
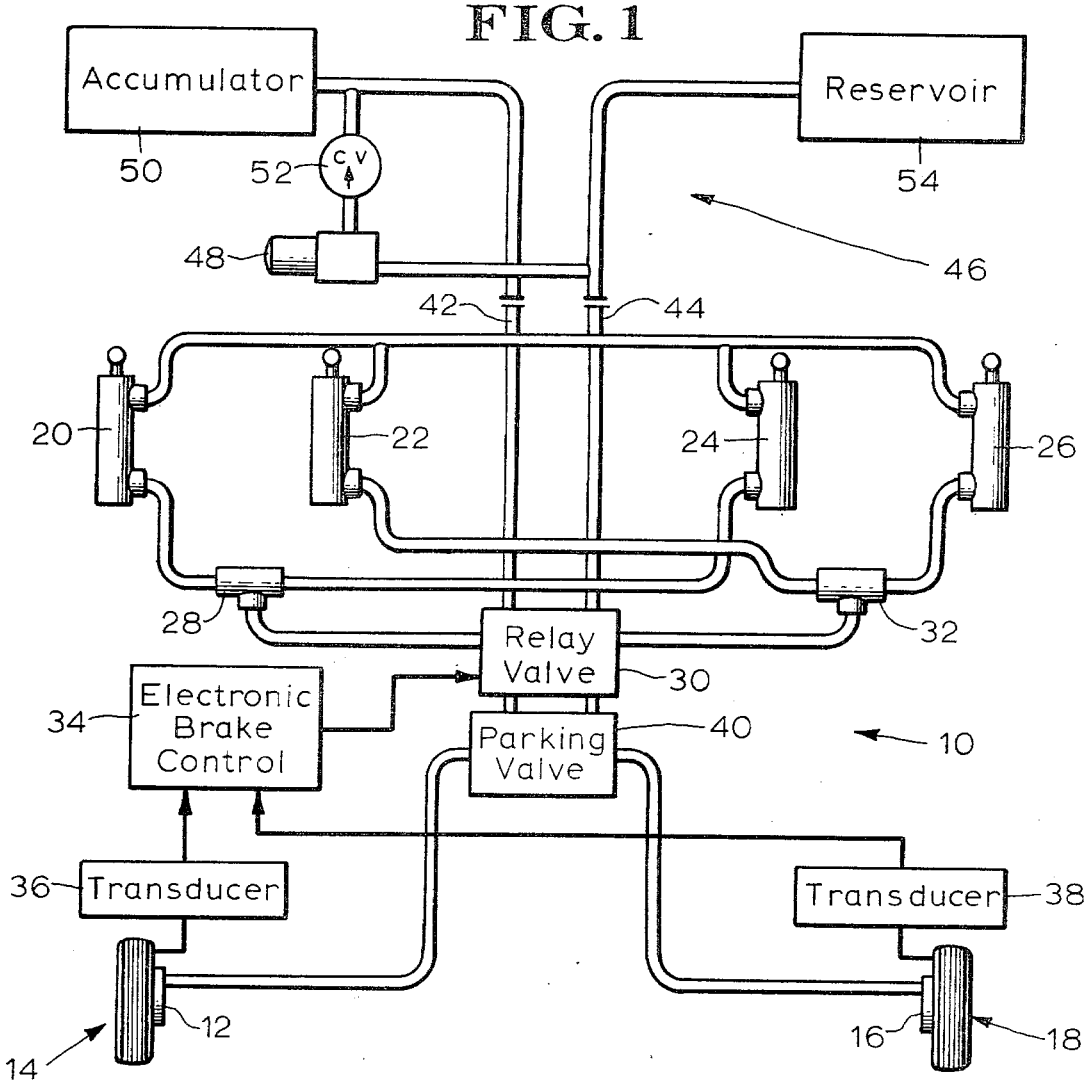
FIG. 1 is a schematic diagram of a hydraulic braking system embodying the present invention and having deceleration control and power-assisted braking.

Referring to FIG. 1, a hydraulic braking system indicated generally by the numeral 10 is illustrated schematically for use on an aircraft. The hydraulic braking system 10 operates a braking means 12 on a left main wheel 14 and a braking means 16 on a right main wheel 18 of the aircraft. The braking system 10 includes master cylinders 20 and 22 for use by the pilot of the aircraft in applying braking to the left main wheel 14 and the right main wheel 18, respectively. Master cylinders 24 and 26 are used by the co-pilot of the aircraft for controlling the braking of the left main wheel 14 and the right main wheel 18, respectively.

The pilot's master cylinder 20 and the co-pilot's master cylinder 24 used in controlling braking of the left wheel 14 are coupled to a left wheel shuttle valve 28. The left wheel shuttle valve 28 isolates the master cylinder being used for braking from the master cylinder that is not being used. Thus, if the pilot is controlling the braking of the aircraft, the left wheel shuttle valve 28 couples the hydraulic pressure from the pilot's master cylinder 20 to the relay valve 30 for controlling the operation of the braking means 12 on the left main wheel 14. At the same time, the left wheel shuttle valve 28 isolates the co-pilot's master cylinder 24 from the relay valve 30. If the co-pilot is controlling the braking action, the left wheel shuttle valve 28 couples hydraulic pressure from the co-pilot's master cylinder 24 to the relay valve 30 and isolates the pilot's master cylinder 20 from the relay valve.

The right wheel shuttle valve 32 operates in a similar manner and is coupled to the pilot's master cylinder 22 and the co-pilot's master cylinder 26 that control the braking of the right main wheel 18. Thus, the right wheel shuttle valve 32 supplies hydraulic master cylinder pressure from either the pilot's master cylinder 22 or the co-pilot's master cylinder 26 to the relay valve 30 to control the braking means 16 on the right main wheel 18.

The relay valve 30 operates in a manual hydraulic mode or a power-assisted mode. In the manual mode of operation, the relay valve 30 couples hydraulic pressure from the left wheel shuttle valve 28 to the braking means 12 on the left main wheel. Additionally, the relay valve 30 couples hydraulic pressure from the right wheel shuttle valve 32 to the braking means 16 on the right main wheel 18. In the power-assisted mode, the relay valve 30 operates to amplify the hydraulic pressure received from the left wheel shuttle valve 28 and the hydraulic pressure received from the right wheel shuttle valve 32, and supply the amplified braking pressure to the left wheel braking means 12 and the right wheel braking means 16, respectively.

The relay valve 30 can be added to the braking system of an aircraft having a manual hydraulic braking system to provide power assist for the aircraft. Additionally, the relay valve 30 can be incorporated in the original design of the braking system for the aircraft.

An electronic brake control 34 may be utilized for controlling the deceleration of the aircraft to prevent skidding of the main wheels 14 and 18 during the braking operation. The electronic brake control 34 receives signals from transducers 36 and 38 associated with the left main wheel 14 and the right main wheel 18, respectively, of the aircraft. The transducers 36 and 38 detect movement of the left wheel 14 and the right wheel 18, respectively. Thus, when a wheel becomes locked and begins to skid, the transducer 36 or 38 detects the skidding condition of the wheel.

The electronic brake control 34 supplies control signals to the relay valve 30 in response to information received from the transducers 36 and 38 on the operation of the left main wheel 14 and the right main wheel 18 of the aircraft. The relay valve 30 in turn reduces the braking pressure being applied to the left main wheel 14 and the right main wheel 18 of the aircraft. The electronic brake control 34 utilized in the hydraulic braking system of the present invention may comprise a conventional form of electronic brake control system known in the art. Typical types of brake control systems suitable for use with the present invention are disclosed in the Anderson U.S. Pat. No. 3,245,727 and the Hirzel U.S. Pat. No. 3,724,916. Thus, the hydraulic braking system of the present invention is not limited to a particular type of electronic brake control system and can utilize electronic brake controls known in the art.

The hydraulic braking system 10 of the present invention also preferably include a parking valve 40 for maintaining hydraulic braking pressure that has been applied to the braking means 12 for the left wheel 14 and the braking means 16 for the right wheel 18. The parking valve 40 operates to lock hydraulic braking pressure in the lines coupled to the braking means 12 and 16 that has been supplied by the relay valve 30 and maintain the braking pressure after braking pressure is no longer being applied by the relay valve 30.

The relay valve 30 is coupled to a hydraulic system pressure line 42 and to a hydraulic return line 44. The system pressure line 42 and the return line 44 are in turn coupled to a powered hydraulic source 46. The powered hydraulic source 46 may comprise either an existing powered hydraulic source present on the aircraft or a self-contained powered hydraulic source that can be added to the hydraulic braking system of an aircraft along with the relay valve 30.

The powered hydraulic source 46 includes a hydraulic pump 48 that is preferably electrically operated to provide a pressured flow of hydraulic fluid. The hydraulic pump 48 supplies a flow of hydraulic pressure to an accumulator 50 and to the system pressure line 42 through a conventional check valve 52. A hydraulic reservoir 54 receives hydraulic fluid from the return line 44 and supplies hydraulic fluid to the hydraulic pump 48.

Referring to FIG. 2, a schematic diagram shows the operation of the relay valve 30 in providing power-assisted braking. The relay valve 30 has a system pressure port 56 that receives system hydraulic pressure from the system pressure line 42. A system return port 58 on the relay valve 30 is coupled to the system return line 44 for returning hydraulic fluid from the relay valve. A relief valve 60 operates to limit the pressure received at the system pressure port 56 and thereby prevents excessive pressure from entering the relay valve 30.

A right master cylinder port 62 on the relay valve 30 receives hydraulic pressure through the right shuttle valve 32 from the right wheel master cylinder, this being either the pilot's master cylinder 22 or the co-pilot's master cylinder 26 depending on the manner in which braking is being applied. A right brake pressure port 64 on the relay valve 30 supplies braking pressure to the braking means 16 on the right wheel 18. A left master cylinder port 66 on the relay valve 30 receives hydraulic fluid through the left wheel shuttle valve 28 from the left wheel master cylinder, this being either the pilot's master cylinders 20 or the co-pilot's master cylinder 24. A left brake pressure port 68 on the relay valve 30 supplies braking pressure to the braking means 12 on the left wheel 14.

Preferably, filters are placed in all ports of the relay valve 30 with the exception of the system return port 58 to prevent contaminants from entering the relay valve 30. The relay valve 30 also preferably includes a pressure sensor 61 for sensing an upper pressure limit and a lower pressure limit for the system pressure entering the system pressure port 56. If desired, the pressure sensor 61 can be used to control operation of the hydraulic pump 48 to maintain system pressure.

The relay valve 30 operates in a manual hydraulic mode or a power-assisted hydraulic mode under the control of a mode shuttle valve 70. System pressure from the system pressure port 56 is supplied through a system pressure cavity 72 to the mode shuttle valve 70. The presence of system pressure moves the mode shuttle valve 70 upward and causes the relay valve 30 to operate in the power-assisted mode. In the manual mode of operation for the relay valve 30, the absence of system pressure results in the shuttle valve 70 being held down by the master cylinder hydraulic pressure entering the port 62 from the right master cylinder.

Referring to FIG. 2, during the operation of the relay valve 30 in the power-assisted mode, hydraulic pressure from the right master cylinder enters the port 62 and passes through the mode shuttle valve 70. A power control channel 74 carries the master cylinder pressure to a metering assembly 76. The metering assembly 76 also receives system pressure from the system pressure cavity 72 as does the mode shuttle valve 70. The metering assembly 76 generates a hydraulic pressure in the braking pressure cavity 78 that is transmitted through the shuttle valve 70 to the port 64. The hydraulic pressure in the braking pressure cavity 78 thus operates the right braking means 16 of the aircraft.

The metering assembly 76 operates to supply a hydraulic braking pressure in proportion to the master cylinder pressure coupled to the metering assembly by the power control cavity 74. A wide range of power-assist ratios can be utilized by controlling the amplifying design of the metering assembly 76 up to the limit imposed by the system pressure supplied to the relay valve 30.

The operation of the metering assembly 76 begins when master cylinder pressure is carried by power control channel 74 to a control cavity 80. The master cylinder pressure in the control cavity 80 causes a piston 82 to move downward and compress a control spring 84. The control spring 84 exerts a downward force on a metering valve 86, thereby causing the metering valve to be displaced downward. System pressure in the system pressure cavity 72 travels around a power annulus 88 on the metering valve 86 into the braking pressure cavity 78. The movement of system pressure into the braking pressure cavity 78 increases the hydraulic pressure within the cavity and transmits hydraulic pressure through the port 64 to the right braking means 16. The flow of system pressure into the braking pressure cavity 72 continues until a force balance on the metering valve 86 exists and the metering valve is placed in an equilibrium position shown in FIG.

2. In the equilibrium position, the force of the hydraulic pressure in the braking pressure cavity 78 against the ends of the metering valve 86 within the cavity 78 is equal to the downward force applied by the control spring 84 to the metering valve.

It will be appreciated that the design of the metering assembly 76 can be varied in order to vary the braking pressure produced by the metering assembly 76 in the braking pressure cavity 78 in response to the master cylinder pressure utilized for controlling the metering assembly. However, the hydraulic pressure produced in the braking pressure cavity 78 cannot exceed the system pressure available in the system pressure cavity 72.

The metering assembly 76 responds to a reduction in the master cylinder pressure applied to the port 62 by reducing the braking pressure cavity 78. When hydraulic pressure is decreased in the right master cylinder, the decreased hydraulic pressure is transmitted by the power control channel 74 to the control cavity 80, thereby reducing the force on the piston 82. The reduced force on the piston 82 is transferred by the control spring 84 to the metering valve 86. The hydraulic pressure in the braking pressure cavity 78 acts to move the metering valve 86 upward, since the force on the metering valve produced by the hydraulic pressure in the braking pressure cavity 78 exceeds the downward force produced in the control cavity 80 on the piston 82. As a result, hydraulic pressure in the braking pressure cavity 78 travels through a return annulus 90 on the metering valve 86 into a return cavity 92. The return cavity 92 dissipates the hydraulic pressure and releases the hydraulic fluid through the port 58 to the system return. The flow of hydraulic fluid out of the braking pressure cavity 78 into the return cavity 92 continues until the metering valve 86 is in an equilibrium state as shown in FIG. 2.

The downward movement of the piston 82 also compresses a response spring 94 that is anchored to the body of the relay valve 30. The response spring 94 is relatively large in comparison to the control spring 84 and provides a pedal feel to the operator of the right master cylinder supplying hydraulic pressure through port 62 to the piston 82.

Figure 3:
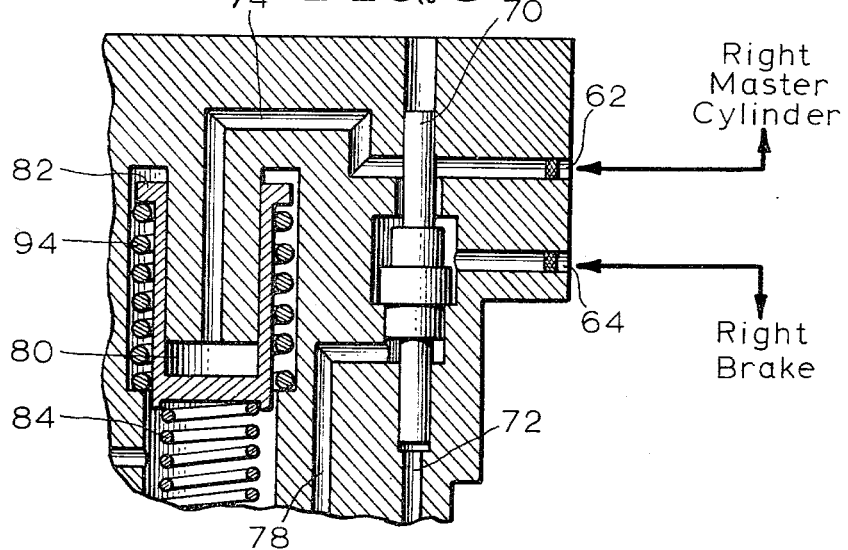
FIG. 3 is a schematic diagram of a portion of the relay valve shown in FIG. 2 operating in a manual mode.

Referring to FIG. 3, the manual hydraulic mode of operation for the relay valve 30 is illustrated. In the manual mode of operation, the mode shuttle valve 70 is held downward in the absence of pressure in the system pressure cavity 72. Hydraulic pressure from the right master cylinder enters the port 62 and travels through the shuttle valve 70 through port 64 to the right braking means 16. Additionally, master cylinder pressure is carried by the power control channel 74 to the control cavity 80. As a result, the piston 82 is deflected downward by the master cylinder pressure in the control cavity 80. However, the amount of hydraulic fluid used to deflect the piston 82 is small since the mechanical stroke of the piston is limited. Thus, in the manual mode of operation, the relay valve 30 operates as a coupling to transmit hydraulic pressure from the right master cylinder to the right braking means 16.

The relay valve 30 continues to operate if a mode transfer, either manual mode to power-assist mode or power-assist mode to manual mode, occurs during braking. If the relay valve 30 is generating braking pressure at braking pressure port 64 in the power-assist mode as shown in FIG. 2, and system pressure fails, the mode shuttle valve 70 shifts downward to the manual mode position and the relay valve 30 operates as shown in FIG. 3 to couple master cylinder hydraulic pressure to the right braking means 16. The shift of the mode shuttle valve 70 downward to the manual mode position occurs when the force on the mode shuttle valve, created by breaking pressure in cavity 78 and system pressure in cavity 72 acting on the effective areas of the shuttle valve, is less than the force of the master cylinder pressure entering port 62 acting on the effective area of the shuttle valve. As a result of the shift of the relay valve 30 to the manual mode, an increased stroke and force are required on the right master cylinder, either master cylinder 22 or 26, to maintain braking effects equal to those produced in the power-assist mode.

If the relay valve 30 is generating braking pressure in the manual mode, as shown in FIG. 3, and system pressure develops, the mode shuttle valve 70 shifts upward to the power-assist position and the relay valve 30 operates in the power-assist mode. The shift to the power-assist mode occurs when the force on the mode shuttle valve 70, created by power-assisted braking pressure in cavity 78 and system pressure in cavity 72 acting on the shuttle valve exceeds the force of master cylinder pressure entering port 62 acting on the shuttle valve. As a result of the transfer of the relay valve 30 to the power-assist mode, a decreased force and stroke is required on the right master cylinder to produce braking effects equal to those produced in the manual mode.

The relay valve 30 has two control sections that are basically the same with one control section operating to supply braking pressure to the right wheel braking means 16 and the other section supplying braking pressure to the left wheel braking means 12. For purposes of illustration, the operation of the relay valve 30 in controlling braking pressure to the right braking means 16 has been described. It will be appreciated, however, that the relay valve 30 operates in a similar manner to control braking pressure to the left braking means 12. The components of the relay valve 30 used for controlling the left braking means 12 that are the same as the components for controlling the right braking means 16 are identified with the same numeral plus the suffix "a". Thus, the metering valve 86a corresponds to the metering valve 86 but operates in the power-assisted mode to control braking pressure for operating the left wheel braking means 12.

The relay valve 30 is also utilized in the hydraulic braking system of the present invention to control the braking pressure in providing deceleration control to prevent skidding of main wheels 14 and 18 of the aircraft. The anti-skid control is achieved by a servo valve 96, shown in FIG. 2, that is mounted on the relay valve 30. If the anti-skid control is not desired in a given application, the ports of the relay valve 30, that communicate with the servo valve 96 can be blocked and the servo valve eliminated. Thus, the relay valve 30 can be used initially without the servo valve 96, with the servo valve 96 being added for providing anti-skid control when needed in a given application.

The servo valve 96 is operated by electrical signals received from the electronic brake control 34 in providing anti-skid control, and utilizes the metering valve 86 providing right wheel braking and the metering valve 86a providing left wheel braking to control braking pressure being applied to the braking means 12 and 16. In the absence of an anti-skid control signal from the electronic brake control 34, flapper 98 that extends into cavity 102 of the servo valve 96 is held against system pressure nozzle 100. In this condition, return nozzle 104 vents the cavity 102 and the metering valves 86 and 86a operate in a normal manner to supply braking pressure to the right braking means 12 and left braking means 16, respectively.

The servo valve responds to electrical control signals from the electronic control unit 34 by alternately moving the flapper 98 to block the return nozzle 104 and open the system pressure nozzle 100 or to block the system pressure nozzle 100 and open the return nozzle 104. Thus, the servo valve 96 is able to modulate the hydraulic pressure in the cavity 102 in response to signals from the electronic brake control 34.

The hydraulic pressure in the cavity 102 is transmitted to the lower ends of the metering valves 86 and 86a. The hydraulic pressure in the cavity 102 causes a force on the metering valve 86 that opposes the force caused by the master cylinder pressure acting on the piston 80 against the metering valve 86. As a result of the disturbed force balance, the metering valve 86 moves upward and hydraulic pressure in braking pressure 78 is released through return annulus 90 on the metering valve into the return cavity 92 until equilibrium is attained for the metering valve 86. Thus, the effect of hydraulic pressure being produced in the anti-skid cavity 102 by servo valve 96 is to decrease the braking pressure in the braking pressure cavity 78. A decrease in hydraulic pressure in the anti-skid cavity 102 allows the metering valve to increase the hydraulic pressure in the breaking pressure cavity 78, by reducing the force acting on the lower end of the metering valve 86.

The hydraulic pressure in the anti-skid cavity 102 also effects the metering valve 86a in a similar manner to control braking pressure in cavity 78a. Therefore, the servo valve 96 operates in response to the electronic brake control 34 to reduce the braking pressure being applied by the relay valve 30 to both the left wheel braking means 12 and the right wheel braking means 16. The reduction of braking pressure prevents the main wheels 14 and 18 from locking and skidding during braking operations.

During the operation of the servo valve 96 to achieve anti-skid control, system pressure in system pressure cavity 72 holds the mode shuttle valve 70 upward in the power-assist mode position at all times, even though no braking pressure exists in cavity 78 and maximum master cylinder exists in channel 74. Thus, the relay valve 30 continues to operate in the power-assist mode and does not shift to the manual mode when braking pressure is at values below master cylinder pressure.

In the relay valve 30 shown in FIG. 2, anti-skid control produced by the servo valve 96 operates to affect the braking pressure being directed to both of the main wheel 16 and 18. Thus, skidding action of either of the main wheels will cause a reduction in braking at both of the main wheels 16 and 18 even if only one of the wheels is in a skidding condition. This is generally desirable in smaller types of aircraft, since differential braking of the main wheels 16 and 18 would cause turning of the aircraft. However, it is sometimes desirable to have independent anti-skid control for each of the main wheels 16 and 18.

A modified relay valve 30' having independent skid control for the metering valves 86a and 86 that control braking pressure for the main wheels 16 and 18 is shown in FIG. 4. The relay valve 30' utilizes two servo valves 96a and 96b that are independently coupled to the metering valves 86a and 86 to provide independent anti-skid control. A modified electronic brake control separately signals the servo valves 96a and 96b to control braking pressure to the left wheel braking means 12 and to the right wheel braking means 16.

It is to be understood that various modifications can be made to the disclosed braking system without departing from the scope of the invention, and it is intended to cover in the appended claims all such modifications as fall within the true spirit and scope of the invention.

What is claimed is:

1. The combination of an anti-skid and hydraulic braking system for a vehicle comprising:
   braking means responsive to hydraulic pressure for decelerating the vehicle;
   master cylinder means for generating a brake control hydraulic pressure to control said braking means;
   a powered hydraulic pressure source for supplying a system hydraulic pressure;
   conversion means for receiving said system hydraulic pressure and said brake control hydraulic pressure, said conversion means being responsive to said brake control hydraulic pressure for generating a braking hydraulic pressure for transmission to said braking means, said conversion means including means for amplifying said braking hydraulic pressure with respect to said brake control hydraulic pressure during all times at which said system hydraulic pressure is present, said braking hydraulic pressure being equal to said brake control hydraulic pressure only in the absence of system hydraulic pressure;
   means for sensing deceleration of the vehicle and for generating a braking control signal; and
   said conversion means including modulating means for reducing said braking hydraulic pressure generated by said conversion means in response to said braking control signal.

2. The combination of an anti-skid and hydraulic braking system of claim 1 wherein said conversion means includes mode control means for accepting said system hydraulic pressure and said brake control pressure, said mode control means modulating said system hydraulic pressure under the control of said brake control pressure for generating said hydraulic braking pressure.

3. The combination of an anti-skid and hydraulic braking system of claim 2 wherein said mode control means includes a mode shuttle valve, said mode shuttle valve receiving said brake control hydraulic pressure from said master cylinder means and receiving said system hydraulic pressure from said hydraulic pressure source.

4. The combination of an anti-skid and hydraulic braking system of claim 1 wherein said conversion means includes metering valve means for generating said braking hydraulic pressure for transmission to said braking means.

5. The combination of an anti-skid and hydraulic braking system of claim 4 further including braking control means for sensing deceleration of the vehicle and for generating a braking control signal, and modulating means for reducing the braking hydraulic pressure generated by said metering valve means in response to the braking control signal of said braking control means.

6. The combination of an anti-skid and hydraulic braking system of claim 1 wherein said conversion means includes mode control means for modulating said system hydraulic pressure to generate said hydraulic braking pressure, and for coupling said brake control hydraulic pressure generated by said master cylinder to said braking means in the absence of system hydraulic pressure.

7. The combination of an anti-skid and hydraulic braking system of claim 6 wherein said mode control means comprises a mode shuttle valve, said mode shuttle valve having an effective area receiving said brake control hydraulic pressure generated by said master cylinder means and an opposing effective area receiving hydraulic system pressure from said powered hydraulic source.

8. The combination of an anti-skid and hydraulic braking system of claim 6 wherein said conversion means includes metering valve means for generating said braking hydraulic pressure for transmission to said braking means.

9. The combination of an anti-skid and hydraulic braking system of claim 1 further including braking control means for sensing deceleration of the vehicle and for generating a braking control signal, and wherein said modulating means reduces said brake pressure output in response to the braking control signal of said braking control.

10. The combination of an anti-skid and hydraulic brake system of claim 1, wherein said master cylinder means is displaceable with a range of displacement between initial and fully displaced positions and wherein said conversion means includes means for amplifying said braking hydraulic pressure with respect to said brake control hydraulic pressure through the full range of displacement of said master cylinder between said initial and said fully displaced positions during all times at which said system hydraulic pressure is present.

11. The combination of an anti-skid and hydraulic braking system of claim 1 wherein said modulating means includes means for reducing said braking hydraulic pressure generated by said conversion means to a pressure which is less than said brake control hydraulic pressure generated by said master cylinder.

12. The combination of an anti-skid and hydraulic braking system of claim 1 wherein said braking hydraulic pressure operates directly upon said braking means.

13. The combination of an anti-skid and hydraulic brake system of claim 1 wherein said master cylinder means is displaceable with a range of displacement between initial and fully displaced positions, and wherein said conversion means includes means for varying said brake control hydraulic pressure through the full range of displacement of said master cylinder between said initial and said fully displaced positions regardless of the presence of system hydraulic pressure.

14. The combination of an anti-skid and hydraulic braking system for a vehicle comprising:
braking means responsive to hydraulic pressure for decelerating the vehicle;
master cylinder means for generating a brake control hydraulic pressure to control said braking means;
a powered hydraulic pressure source for supplying a system hydraulic pressure;
conversion means for receiving said system hydraulic pressure and said brake control hydraulic pressure, said conversion means being responsive to said brake control hydraulic pressure for generating a braking hydraulic pressure for transmission to said braking means, said braking hydraulic pressure being always amplified with respect to and controlled by said brake control hydraulic pressure in the presence of said system hydraulic pressure, said braking hydraulic pressure being equal to said brake control hydraulic pressure only in the absence of system hydraulic pressure, said conversion means including metering valve means for generating said braking hydraulic pressure for transmission to said braking means;
braking control means for sensing deceleration of the vehicle and for generating a braking control signal;
said conversion means also including modulating means for reducing said braking hydraulic pressure generated by said conversion means in response to said braking control signal, said modulating means including a servo valve for generating a deceleration-control hydraulic pressure in response to said braking control signal from said braking control means, said deceleration-control hydraulic pressure acting on said metering valve means to reduce said braking hydraulic pressure generated by said metering valve means.

15. The combination of an anti-skid and hydraulic braking system for a vehicle comprising:
braking means responsive to hydraulic pressure for decelerating the vehicle;
master cylinder means for generating a brake control hydraulic pressure to control said braking means;
a powered hydraulic pressure source for supplying a system hydraulic pressure;
conversion means for receiving said system hydraulic pressure and said brake control hydraulic pressure, said conversion means being responsive to said brake control hydraulic pressure for generating a braking hydraulic pressure for transmission to said braking means, said braking hydraulic pressure being always amplified with respect to and controlled by said brake control hydraulic pressure in the presence of said system hydraulic pressure, said braking hydraulic pressure being equal to said brake control hydraulic pressure only in the absence of system hydraulic pressure, said conversion means including metering valve means for generating said braking hydraulic pressure for transmission to said braking means;
braking control means for sensing deceleration of the vehicle and for generating a braking control signal;
said conversion means also including a braking pressure cavity, and said metering valve means including power annulus means for transmitting system hydraulic pressure supplied by said powered hydraulic source into said braking pressure cavity in response to an increase in said brake control hydraulic pressure generated by said master cylinder means.

16. The combination of an anti-skid and hydraulic braking system of claim 15 wherein said metering valve means further includes return annulus means for returning braking hydraulic pressure in said braking pressure cavity to said powered hydraulic source in response to a decrease in the hydraulic pressure generated by said master cylinder means.

17. The combination of an anti-skid and hydraulic braking system for use with the braking apparatus of a vehicle, comprising:
means for supplying pressurized hydraulic fluid at a system hydraulic pressure;

operator activated displaceable means for providing a brake control pressure; and brake pressure valving means accepting said pressurized hydraulic fluid for providing a hydraulic brake pressure output which is a function of only said brake control pressure, said brake pressure output being applied to the braking apparatus and being amplified with respect to and controlled by said brake control pressure;

means for sensing deceleration of the vehicle and for generating a braking control signal, and said brake pressure valving means includes modulating means for reducing the hydraulic brake pressure output in response to said braking control signal.

18. The combination of an anti-skid and hydraulic braking system of claim 17 wherein said brake valving means includes metering valve means for generating said hydraulic brake pressure output as a function of said brake control pressure.

19. The combination of an anti-skid and hydraulic braking system of claim 18 further including braking control means for sensing deceleration of the vehicle and for generating a braking control signal, and modulating means for reducing the hydraulic brake pressure output generated by said metering valve means in response to the braking control signal of said braking control means.

20. The combination of an anti-skid and hydraulic braking system of claim 17 wherein said braking pressure valving means includes means for modulating said system hydraulic pressure to generate said hydraulic brake pressure output as a function of said brake control force.

21. The combination of an anti-skid and hydraulic braking system of claim 17 wherein said operator activated displaceable means is displaceable with a range of displacement between initial and fully displaced positions and wherein said braking hydraulic pressure is a function of said brake control pressure through the full range of displacement of said operator activated displaceable means between said initial and fully displaced positions.

22. The combination of an anti-skid and hydraulic braking system of claim 17 wherein said modulating means includes means for reducing said hydraulic brake pressure output generated by said conversion means to a pressure below said brake control pressure generated by said operator activated means.

23. The combination of an anti-skid and hydraulic braking system for use with the braking apparatus of a vehicle, comprising:

means for supplying pressurized hydraulic fluid at a system hydraulic pressure;

operator activated displaceable means for providing a brake control pressure; and brake pressure valving means which accepts said pressurized hydraulic fluid and provides a hydraulic brake pressure output which is a function of said brake control pressure, said brake pressure output being applied to the braking apparatus and being amplified with respect to and controlled by said brake control pressure;

means for sensing deceleration of the vehicle and for generating a braking control signal;

said brake pressure valving means including modulating means for reducing said hydraulic brake pressure output in response to said braking control signal;

said brake valving means further including a braking pressure cavity and metering valve means for generating said hydraulic brake pressure output as a function of said brake control pressure; and said metering valve means including power annulus means for transmitting system hydraulic pressure into said braking pressure cavity in response to an increase in said brake control pressure.

24. The combination of an anti-skid and hydraulic braking system for use with the braking apparatus of a vehicle, comprising:

means for supplying pressurized hydraulic fluid at a system hydraulic pressure;

operator activated displaceable means for providing a brake control pressure;

brake pressure valving means for accepting said pressurized hydraulic fluid, said brake pressure valving means including means for providing a hydraulic brake pressure output which is a function of said brake control pressure and is always independent of vehicle speed, said hydraulic brake pressure output being applied to the braking apparatus and being amplified with respect to and controlled by said brake control pressure;

means for sensing deceleration of the vehicle and for generating a braking control signal, and said brake pressure valving means includes modulating means for reducing said hydraulic brake pressure output in response to said braking control signal.

* * * * *